United States Patent [19]

Sugimoto et al.

[11] Patent Number: 4,734,305

[45] Date of Patent: Mar. 29, 1988

[54] HIGH-PRESSURE RUBBER HOSE

[75] Inventors: Masatoshi Sugimoto; Kiyomitsu Terashima, both of Nagoya, Japan

[73] Assignee: Toyoda Gosei Co., Ltd., Nishikasugai, Japan

[21] Appl. No.: 836,996

[22] Filed: Mar. 6, 1986

[30] Foreign Application Priority Data

Mar. 8, 1985 [JP] Japan ............................ 60-046747

[51] Int. Cl.$^4$ ............................................. F16L 11/00
[52] U.S. Cl. ..................................... 428/36; 428/246; 428/521; 138/126; 138/137
[58] Field of Search .................. 138/126, 137; 428/36, 428/521, 246; 525/331.7, 281, 282, 283

[56] References Cited

U.S. PATENT DOCUMENTS

| | | | |
|---|---|---|---|
| 3,862,106 | 1/1975 | Fischer | 525/331.7 |
| 3,884,895 | 5/1975 | Eckert et al. | 525/349 |
| 3,932,559 | 1/1976 | Cantor et al. | 525/138 |
| 3,936,430 | 2/1976 | Schoen et al. | 525/331.7 |
| 4,091,843 | 5/1978 | Mikes et al. | 138/126 |
| 4,096,888 | 7/1978 | Stefano et al. | |
| 4,154,777 | 5/1979 | Shoji et al. | 525/243 |
| 4,200,722 | 4/1980 | Pennings et al. | 526/281 |
| 4,435,466 | 3/1984 | Kuhnel et al. | 428/521 |
| 4,603,712 | 8/1986 | Krause | 428/36 |

Primary Examiner—John E. Kittle
Assistant Examiner—James J. Seidleck
Attorney, Agent, or Firm—Cushman, Darby & Cushman

[57] ABSTRACT

A high-pressure rubber hose has a reinforcing layer embedded therein, has at least an outer layer thereof formed of the vulcanization product of an ethylene-propylene-diene copolymer rubber (hereinafter referred to as "EPDM" for short), and is adapted to be used as fastened by staking to a sleeved joint. The high-pressure rubber hose requires that the ethylene/$\alpha$-olefin ratio (by weight) in the EPDM should fall in the range of 45/55 to 58/42 and that the Mooney viscosity of polymer ($ML_{1+4}$ 100° C.) of the EPDM should fall in the range of 120 to 250. This high-pressure rubber hose manifests dynamic resistance to ozone and mechanical properties such as tensile strength to advantage without any sacrifice of the compression permanent set necessary for the sake of the sealing property.

3 Claims, 2 Drawing Figures

HIGH-PRESSURE RUBBER HOSE

BACKGROUND OF THE INVENTION

This invention relates to a high-pressure rubber hose which has a reinforcing layer embedded therein, has at least an outer layer thereof formed of a vulcanized ethylene-α-olefin-diene copolymer rubber (hereinafter referred to as "EPDM" for short), and is adapted to be used as fastened by staking to a sleeved joint. As examples of uses found for this high-pressure rubber hose, there may be citted hoses for the hydraulic system such as a brake hose and a clutch hose, hoses for the air system, and hoses for the coolant system.

In most brake hoses, their outer layers have been formed of a vulcanized CR (chloroprene) rubber or a vulcanized CR-EPDM blend rubber (Japanese Patent Publication No. SHO 59(1984)-36,158). Recently, growth of engine output and adoption of turbo engines have compelled brake hoses to be used under increasingly harsh conditions. In the meantime, the desirability of developing brake hoses which require no maintenance has been finding growing recognition.

Neither the CR rubber not the CR-EPDM blend rubber mentioned above has been capable of acquiring an ability to resist dynamically the action of ozone to a point where the obviation of the necessity for maintenance is realized (Table 1).

It has been proposed to form the outer layer of a brake hose, for example, with a vulcanized rubber of EPDM which excels in dynamic resistance to ozone, resistance to heat, and resistance to weather conditions (Japanese Patent Application Laid-open No. SHO 55(1980)-2,805). Unfortunately, none of the EPDM species heretofore proposed to the art is capable of retaining compression-proof permanent set indispensable to the sealing property and, at the same time, manifesting such mechanical properties such as tensile strength ($T_B$), tear strength ($T_R$), and volume relaxation fracture to advantage (Comparative Experiment in Table 1). When such an EPDM rubber hose is fastened by staking to a sleeved joint, for example, it has the possibility of sustaining breakage in the staked end after thermal aging. Thus, the conventional EPDM rubber has failed to meet the need for obviating the required maintenance.

SUMMARY OF THE INVENTION

The high-pressure rubber hose of the present invention has at least an outer layer thereof formed of the vulcanization product of an ethylene-α-olefin-diene copolymer (EPDM) rubber (1) whose ethylene/α-olefin ratio (by weight) falls in the range of 45/55 to 58/42 and (2) whose Mooney viscosity of polymer ($ML_{1+4}$ 100° C.) falls in the range of 120 to 250. Because of this construction, the present invention brings about the following effect.

The high-pressure rubber hose manifests dynamic resistance to ozone and mechanical properties such as tensile strength to advantage with no sacrifice of compression-proof permanent set necessary for the sake of the sealing property. When this high-pressure rubber hose is fastened by staking to a sleeved joint, therefore, the outer layer thereof will sustain no breakage in the staked end even after thermal aging. When it is used as a brake hose, for example, the brake hose enjoys notably improved durability and answers the cry for obviation of maintenace.

DESCRIPTION OF THE PREFERRED EMBODIMENT

Now, the constituents of the present invention will be described in detail below.

(1) If the ethylene/α-olefin ratio is not more than 45/55, mechanical properties such as tensile strength are not satisfactory. If this ratio exceeds 58/42, the compression-proof permanent set is not sufficient. Generally propylene is used as the α-olefin. Optionally, 1-butene, for example, may be used instead.

(2) If the Mooney viscosity of polymer ($ML_{1+4}$ 100° C.) is less than 120, the mechanical properties such as tensile strength are insufficient. If it exceeds 250, the productivity of the polymer is inferior.

(3) The polymer of EPDM is obtained by polymrizing ethylene, an α-olefin, and diene in an inactive solvent under atmospheric pressure or a slightly increased pressure in the presence of a suitable catalyst. For this polymerization, the diene is incorporated in such an amount that the iodine number of the produced EPDM polymer will fall in the range of 1 to 30. Generally as the diene, one member or a mixture of two or more members selected from the group consisting of such non-conjugate dienes as ethylidene norbornene, vinyl norbornene, dicyclopentadiene, 1,4-hexdiene, 2-methyl-1,5-hexadiene, 1,6-octadiene, 1,5-octadiene, 1,4-octadiene, and methylhydroindene. Optionally, the diene may incorporate therein a conjugate diene such as butadiene or isoprene.

Figure 1:
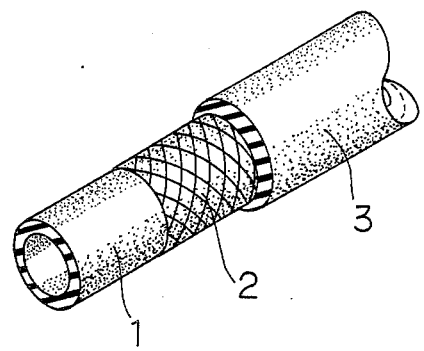
FIG. 1 is a perspective view illustrating a typical high-pressure rubber hose embodying the present invention.
Figure 2:
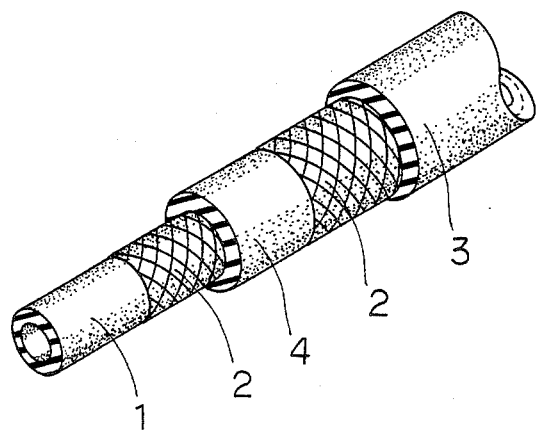
FIG. 2 is a perspective view illustrating another typical high-pressure rubber hose similarly embodying the present invention.

(4) Generally, the high-pressure rubber hose is produced in a three-layer construction, consisting of an inner tube layer 1, a reinforcing layer 2, and an outer tube layer (outer layer) 3 as illustrated in FIG. 1 or in a five-layer construction, consisting of an inner tube layer 1, a reinforcing layer 2, an intermediate layer 4, a reinforcing layer 2, and an outer tube layer 3 as illustrated in FIG. 2. Optionally, the outer tube layer, the intermediate layer, and the inner layer may be severally formed in two layers or three layers. As regards the materials for the high-pressure rubber hose used as a brake hose, for example, the inner tube layer is made of SBR, the reinfrocing layer made of a knit fabric of Vinylon, rayon, or polyester, the intermediate layer made of natural rubber, EPDM, or butyl rubber, and the outer tube layer made of the aforementioned novel, specific EPDM.

EXAMPLES

The rubber hoses of working examples and comparative experiments were obtained in the construction shown in FIG. 2 as follows.

(1) The inner tube of SBR 3.3 mm in inside diameter and 5.3 mm in outside diameter was produced by extrusion.

(2) The reinforcing layer was formed by combining 20 lower reinforcing 1200-d Vinylon 2-ply yarns and 24-upper reinforcing 1200-d Vinylon 3-ply yarns.

(3) The intermediate layer was formed by winding an EPDM sheet (0.4 mm in thickness) at the same time that the upper reinforcing yarns were knit.

(4) The outer tube was formed by covering the upper reinforcing layer with a material incorporating a polymer of a varying comonomer ratio indicated in Table 1 in a formula shown below (wherein CR represents a material heretofore used in the outer tube of the conventional hose) so that the produced hose would acquire an outside diameter of 10.5 mm.

| Formula (parts by weight) | |
|---|---|
| Polymer | 100 |
| Zinc oxide | 5 |
| Stearic acid | 1 |
| FEF carbon | 120 |
| Paraffin type oil | 80 |
| Sulfur | 1 |
| Vulcanization accelerator CZ*[1] | 2 |
| Vulcanization accelerator TT*[2] | 0.5 |
| Vulcanization accelerator D*[3] | 0.5 |

(Note)
*[1] cyclohexyl-benzothiazyl sulfonamide
*[2] Tetramethylthiuram disulfide
*[3] N—Phenyl-2-naphthylamine (5) The hose completed was vulcanized with steam at 150° C. for 30 minutes.

tensile test (dumbell No. 3) specified by JIS K-6301, with necessary modifications.

(2) Tear strength was tested by following the procedure of tear test (B type) specified by JIS K-6301, with necessary modifications.

(3) Heat relaxation disruption was determined by stretching test pieces (dumbell No. 3) to varying ratios (ratios graduated by 50% between 100% and 400%), allowing the stretched test pieces to stand in an atmosphere kept at 120° C. for 4 hours, and measuring critical elongation of a test piece verging on fracture.

(4) Permanent set under compression was tested by following the procedures of compression permanent set test (at 120° C. for 22 hours) and low-temperature compression permanent set test (at −20° C. for 22 hours) specified by JIS K-6301.

(5) Resistance to cold was tested by following the procedure of low-temperature impulse embrittlement test (using isopropyl alcohol as heat transfer medium) specified by JIS K-6301.

(6) Dynamic resistance to ozone was determined by exposing a test piece to repeated elongation (0↔30% 60 rpm) and clocking the total time of repeated elongation before impartation of tear on the test piece, by following the procedure of ozone test specified by JIS K-6301.

TABLE 1

| | | Experiment | | | | | | | | Reference |
|---|---|---|---|---|---|---|---|---|---|---|
| | | Examples | | | Comparisons | | | | | |
| | | 1 | 2 | 3 | 1 | 2 | 3 | 4 | 5 | 6 | |
| Specification of EPDM polymer | Ethylene/propylene | 49/51 | 56/44 | 56/44 | 47/53 | 57/43 | 57/43 | 63/37 | 74/26 | 74/26 | C R |
| | Viscosity (ML$_{1+4}$ 100° C.) | 180 | 180 | 210 | 48 | 65 | 105 | 135 | 38 | 210 | |
| | Iodine value | 12 | ← | 12 | 11 | 15 | ← | 15 | 19 | 19 | |
| <Test for physical properties> | | | | | | | | | | | |
| Disruption by staking after thermal aging | Presence of disruption in outer layer | No | ← | No | Yes | ← | ← | ← | ← | Yes | No |
| Stationary Properties | Hs (JISA) | 67 | 67 | 68 | 63 | 66 | 66 | 66 | 72 | 67 | 65 |
| | T$_B$ (kgf/cm$^2$) | 135 | 151 | 165 | 90 | 116 | 129 | 135 | 84 | 157 | 196 |
| | E$_B$ (%) | 580 | 610 | 650 | 600 | 530 | 530 | 510 | 410 | 460 | 570 |
| Tear strength | T$_R$ (kgf/cm) | 41 | 42 | 44 | 34 | 36 | 37 | 37 | 29 | 41 | 66 |
| Heat relaxation disruption | Critical elongation (%) | 300 | 300 | 350 | 250 | 200 | 200 | 150 | 150 | 150 | 350 |
| Compression permanent set | High-temperature CS (%) | 28 | 30 | 31 | 31 | 36 | 32 | 33 | 74 | 79 | — |
| | Low-temperature CS (%) | 55 | 56 | 45 | 83 | 67 | 61 | 56 | 75 | 48 | 39 |
| Resistance to cold | Embrittling temperature (°C.) | −60> | ← | ← | ← | ← | ← | ← | ← | −60> | −52.6 |
| Dynamic resistance to ozone | Total time of impartation of tear (hr) | 1000< | ← | ← | ← | ← | ← | ← | ← | 1000< | 301~468 |

Each of the high-pressure rubber hoses obtained as described above was fastened by staking at eight points each in two stages (staking ratio 44±3%) to a sleeved joint, left standing in an atmosphere kept at 120° C. for 70 hours, removed in a disassembled state from the sleeved joint, and carefully examined to determine whether or not the outer layer rubber had been disrupted because of staking. The results are shown in Table 1 as "disruption of staked end after thermal aging."

For the sake of reference, a rubber material incorporating the same polymer and prepared in the same formula as the rubber material used for the high-pressure rubber hose mentioned above was vulcanized under the same conditions as mentioned above. Test pieces taken from the vulcanized rubber material were tested for the following properties.

(1) Stationary properties (Hs (hardness), T (tensile strength), and E (elongation)) were tested by following the procedures of spring type hardness test (A type) and

What is claimed is:

1. A multi-layer high-pressure rubber hose having a reinforcing layer embedded therein, and adapted to be fastened by staking to a sleeved joint, wherein:
   (a) at least an outer layer of said hose is formed of the vulcanized product of an ethylene-propylene-diene copolymer rubber (hereinafter "EPDM"),
   (b) in said EPDM, the ratio of ethylene-propylene is in the range 49/51 to 56/44,
   (c) the Mooney viscosity of polymer (ML$_{1+4}$ 100° C.) of said EPDM is in the range 180–210, and the dynamic resistance to ozone is more than 1000 hours of total time until impartation of tearing, as measured using the ozone test specified by JIS K-6301, using repeated elongation from 0 to 30 percent elongation and back at 60 rpm.

2. A high-pressure rubber hose according to claim 1, wherein said diene as one of the monomers of said EPDM is used in an amount such that the iodine value of the produced EPDM polymer falls in the range 1 to 30.

3. A high-pressure rubber hose according to claim 1, wherein said diene as one of the monomers of said EPDM is one member or a mixture of two or more members selected from the group consisting of ethylidene norbornene, vinyl norbornene, dicyclopentadiene, 1,4-hexadiene, 2-methyl-1,5-hexadiene, 1,6-octadiene, 1,5-octadiene, 1,4-octadiene, and methyl hydroindene.

* * * * *